United States Patent [19]

Nelson

[11] 4,031,997

[45] June 28, 1977

[54] MOBILE TELESCOPICAL ARTICULATED CASCADE CONVEYOR SYSTEM FOR MINING AND AUTOMATIC SELF-TRAMMING WHEEL-MOUNTED CONVEYOR UNIT THEREFOR

[75] Inventor: Robert C. Nelson, Bluefield, W. Va.

[73] Assignee: New River Manufacturing Company, Inc., Glen Lyn, Va.

[22] Filed: Dec. 5, 1975

[21] Appl. No.: 637,977

[52] U.S. Cl. .............................. 198/301; 198/303; 198/588; 198/589; 280/6 H; 299/45

[51] Int. Cl.² ......................................... B65G 21/14

[58] Field of Search .................. 198/82, 84, 86, 89, 198/92, 95, 96, 102, 111, 118, 233, 301, 303, 588, 589, 594, 862, 863; 299/43–45, 64–67; 37/DIG. 20; 280/6 H

[56] References Cited

UNITED STATES PATENTS

| | | | |
|---|---|---|---|
| 2,805,760 | 9/1957 | Von Stroh et al. | 198/92 |
| 2,805,761 | 9/1957 | Von Stroh et al. | 198/89 X |
| 3,003,612 | 10/1961 | Poundstone | 198/233 |
| 3,107,776 | 10/1963 | Long | 198/89 |
| 3,186,730 | 6/1965 | Angell | 280/6 H |
| 3,268,058 | 8/1966 | Buckerridge | 198/92 |
| 3,279,584 | 10/1966 | Towles | 198/233 X |
| 3,306,667 | 2/1967 | Todd | 198/89 X |
| 3,456,982 | 7/1969 | Reilly | 198/92 X |
| 3,497,055 | 2/1970 | Oslakovic | 198/92 |

FOREIGN PATENTS OR APPLICATIONS

| | | | |
|---|---|---|---|
| 1,517,359 | 3/1968 | France | 280/6 H |
| 1,018,787 | 10/1957 | Germany | 198/89 |
| 1,405,336 | 10/1969 | Germany | 280/6 H |

*Primary Examiner*—Evon C. Blunk
*Assistant Examiner*—Richard K. Thomson
*Attorney, Agent, or Firm*—McCaleb, Lucas & Brugman

[57] ABSTRACT

A mobile conveyor system having a series of articulately interconnected mobile conveyor units arranged in cascade relationship for conveying mined material from a movable mining machine to a remote stationary floor conveyor. The series includes inbye and outbye units which are bridge conveyors, and at least one intermediate unit. The discharge end of the inbye unit has a carriage supported for movement along the receiving portion of the adjacent intermediate unit. The articulated interconnection between the receiving end of the outbye unit and the discharge end of the adjacent intermediate unit has a fixed lapped relation; a bottom-engaging skid, and springs urging the adjacent units into alignment. Each intermediate unit has a pair of self-powered tram wheels, and a mine-bottom-engaged receiving end providing a stable three-point ground support both when moving and stationary. An automatic control powers the tram wheels in response to relative movement between adjacent units.

10 Claims, 20 Drawing Figures

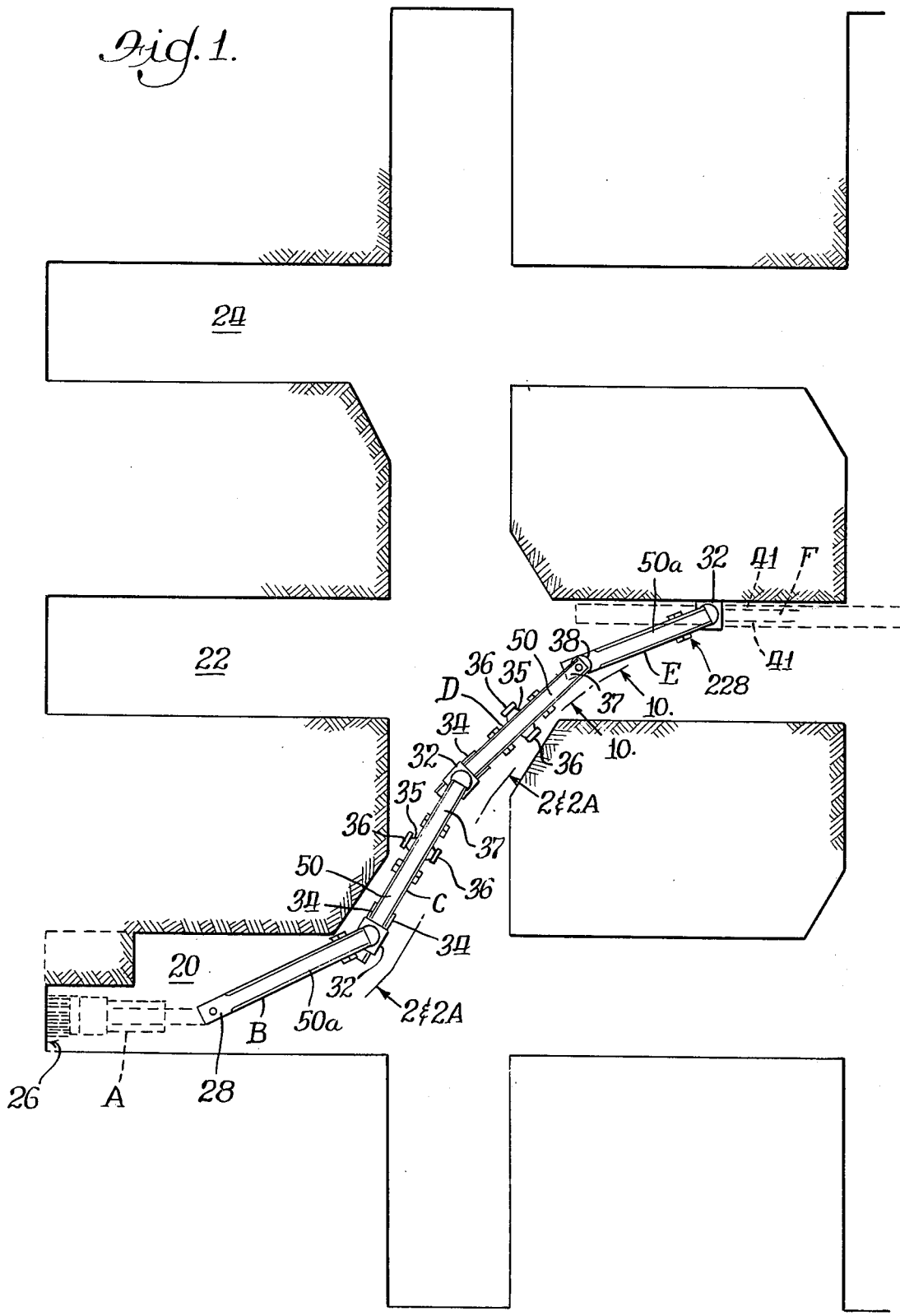

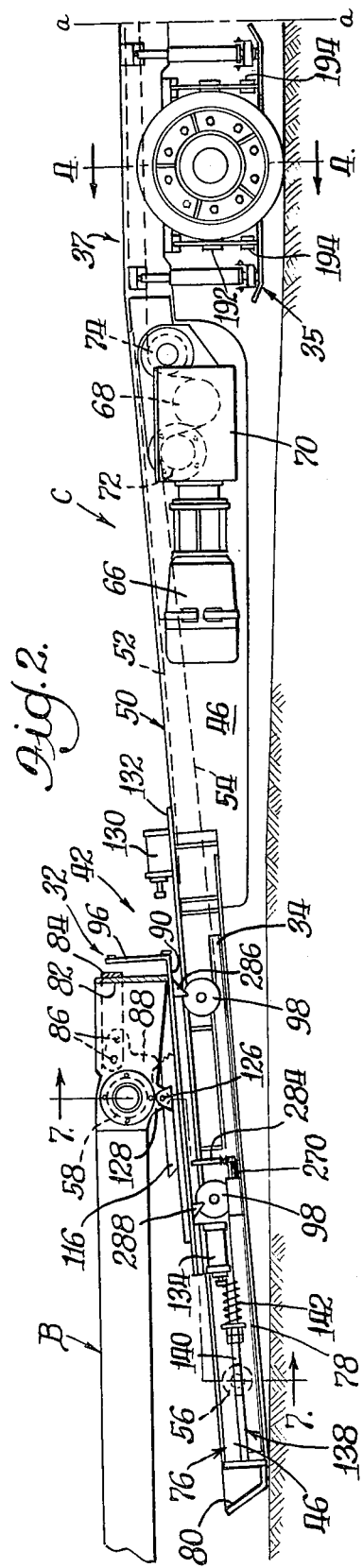
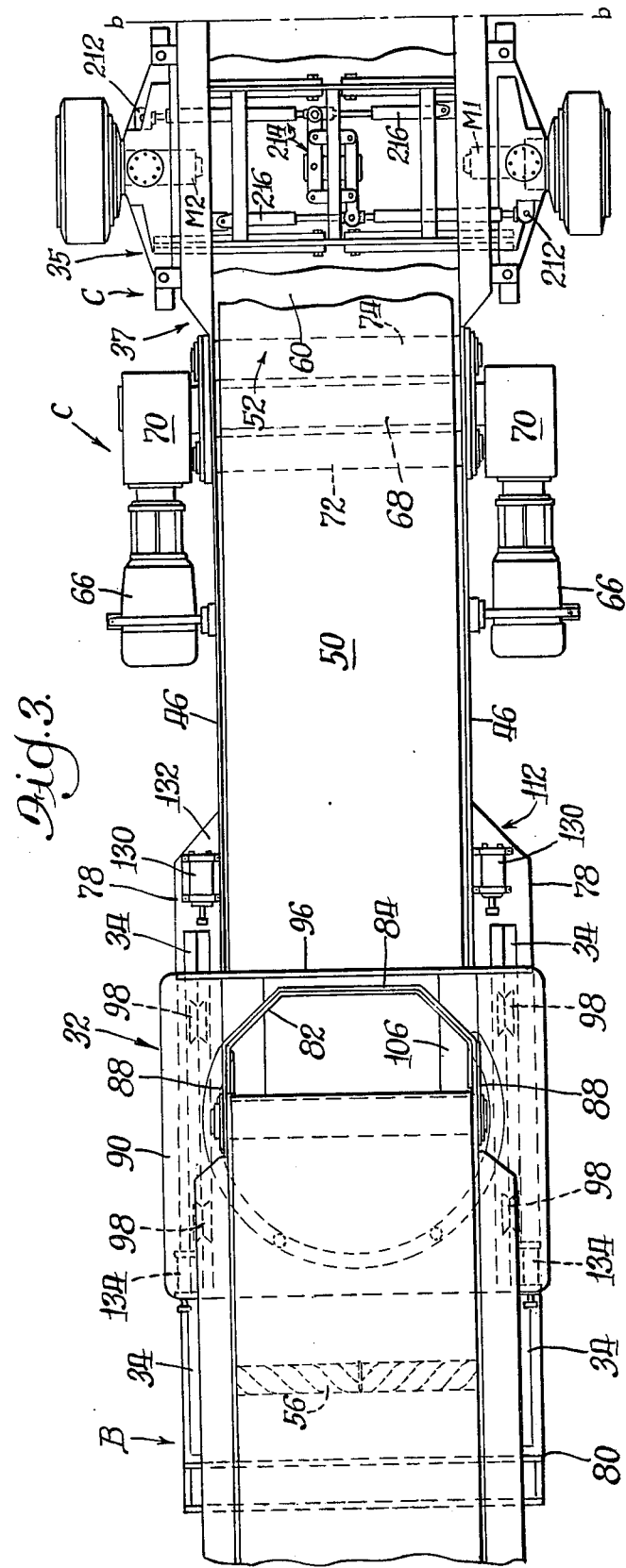

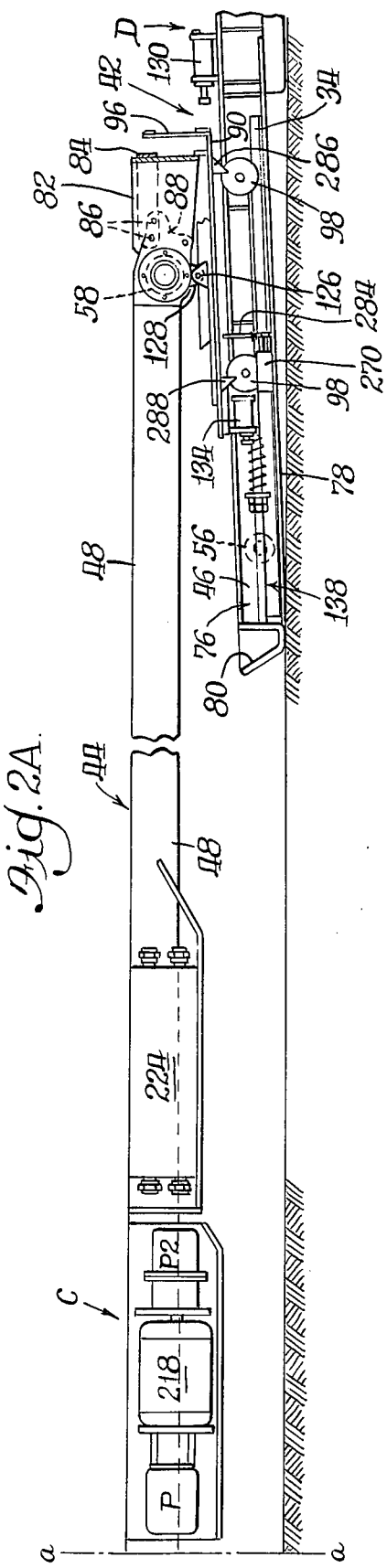

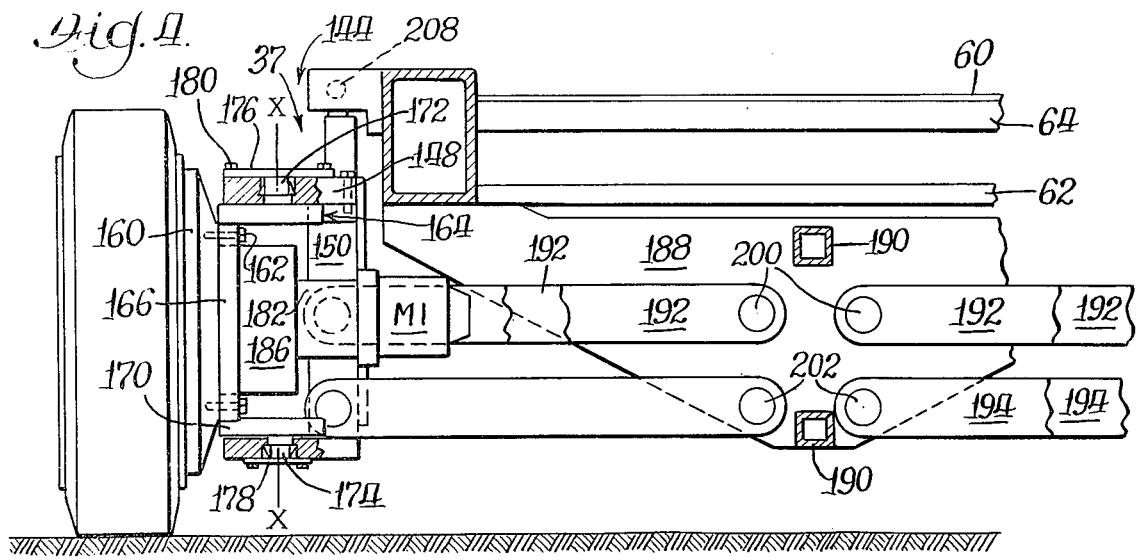
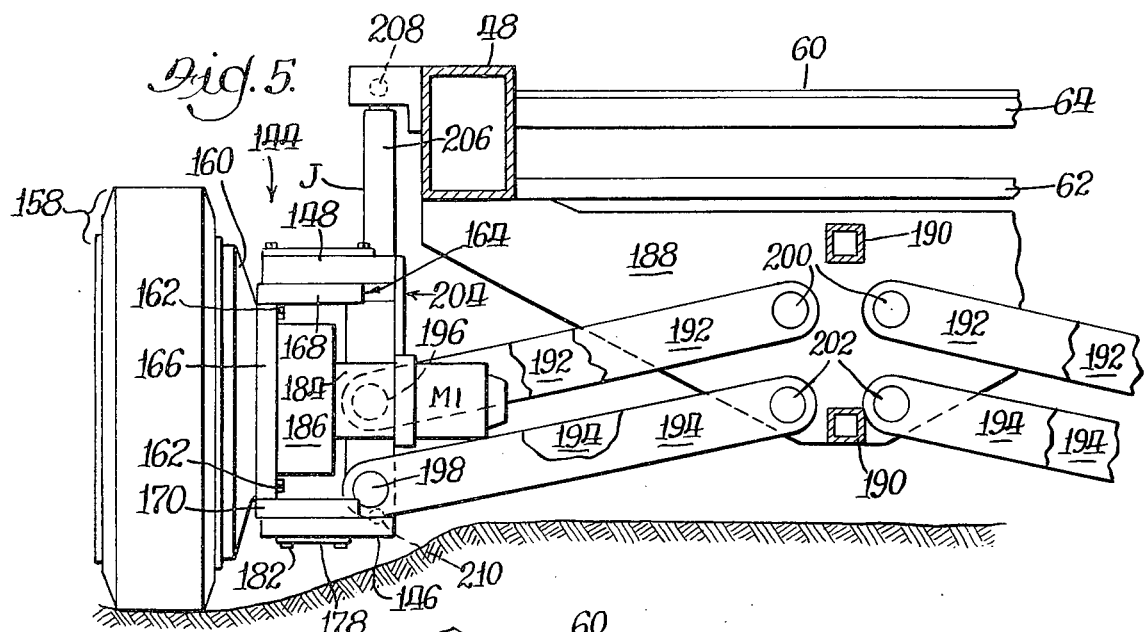
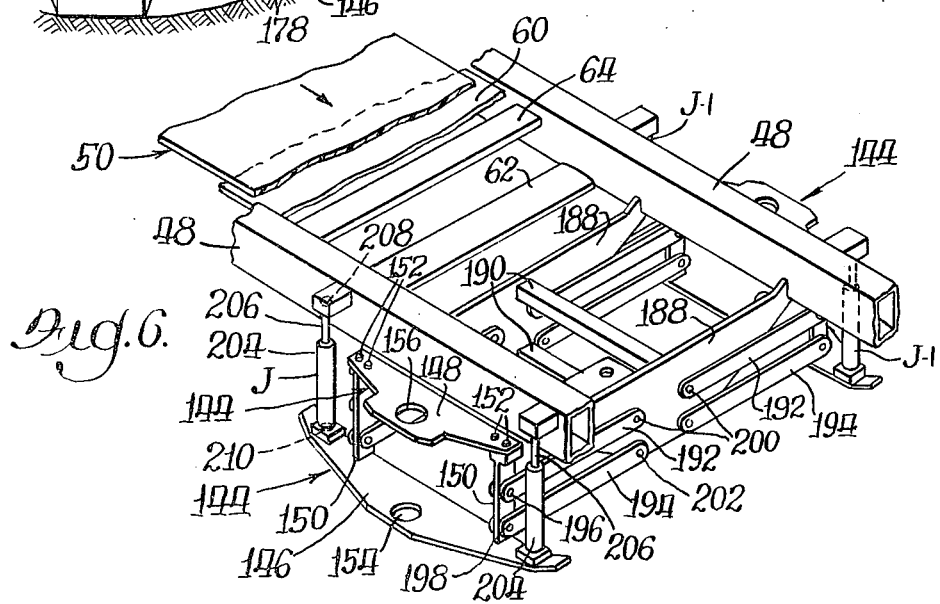

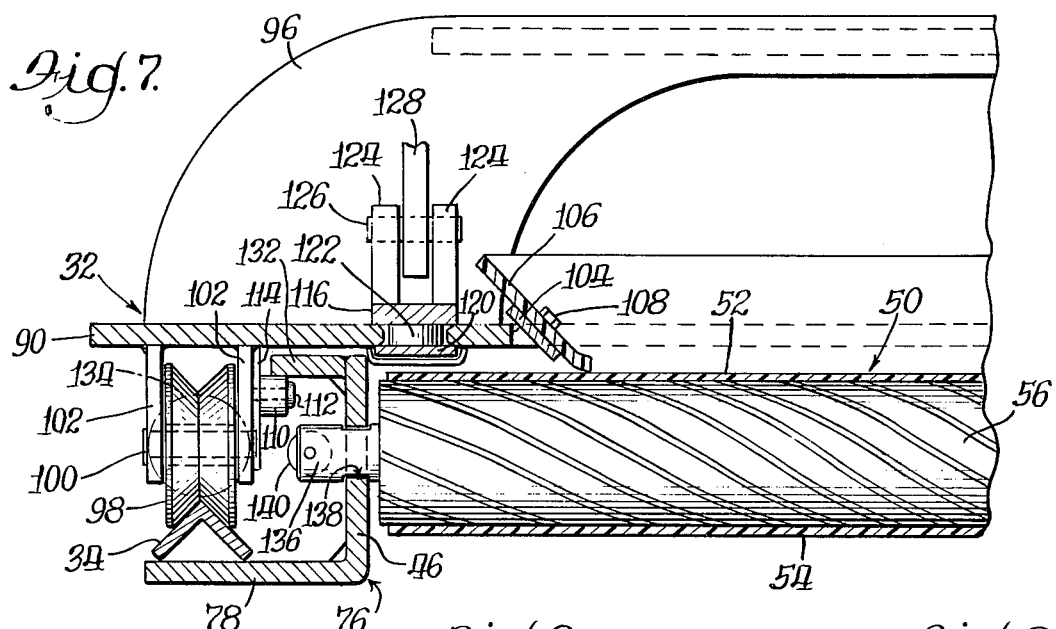
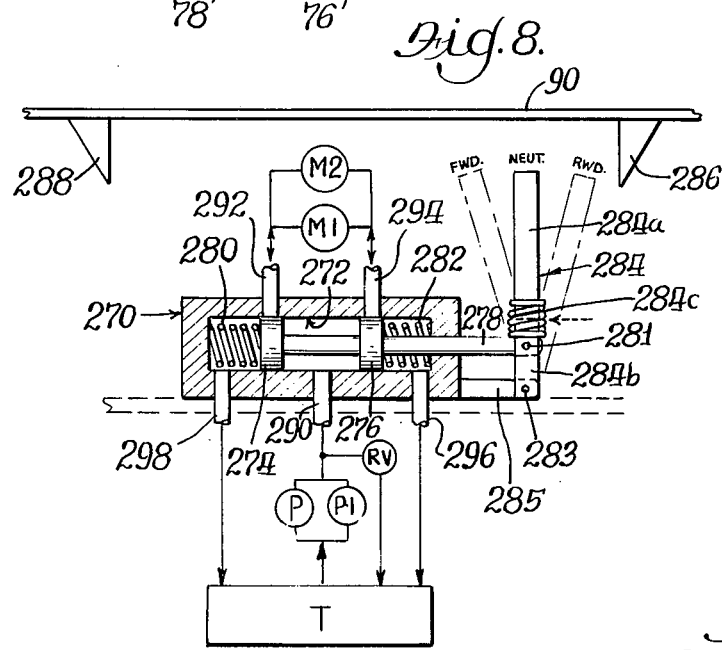
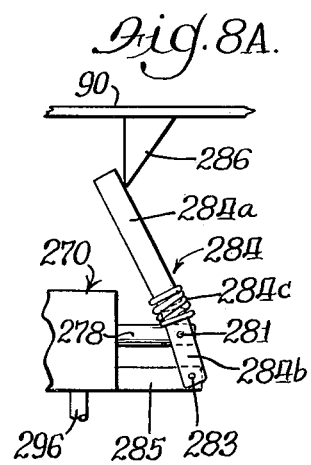
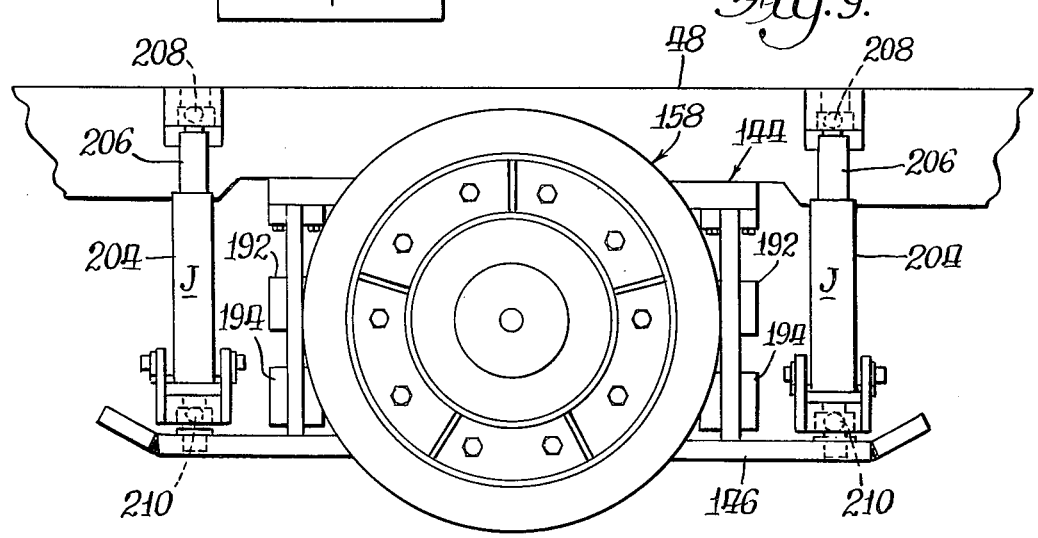

MOBILE TELESCOPICAL ARTICULATED CASCADE CONVEYOR SYSTEM FOR MINING AND AUTOMATIC SELF-TRAMMING WHEEL-MOUNTED CONVEYOR UNIT THEREFOR

BACKGROUND OF THE INVENTION

The field of the invention is generally that of extensible or movable conveyor systems for continuously conveying material from a moving receiving location such as a mine face to a relatively fixed discharge location.

In a typical underground coal mining system where the present invention can be used to advantage, three or more parallel rooms may be driven up or retreated simultaneously. A mining machine, either a continuous miner or a loader, follows the advancing or retreating mine face in each room in turn, constantly shifting from one room to another. A fixed floor conveyor such as a panel belt conveyor or room conveyor is generally within a few hundred feet of the mine face and carries the mined coal to a main mine conveyor system or to coal cars, for transfer out of the mine, above ground. The fixed floor conveyor is moved, or extended or shortened, from time to time to keep it within a reasonable distance of the face.

Systems for moving coal from the mining machine to the fixed floor conveyor are either intermittent, or continuous.

The predominant method for moving coal from the face is by shuttle car which is intermittent or discontinuous. It has the basic disadvantage that it does not move the coal continuously, so continuous mining machines operating at the face either have to stop when no shuttle car is present or they require extra equipment such as loading machines or surge cars to store coal between shuttle car trips so the mining machine can operate continuously. Notwithstanding this disadvantage, shuttle cars have offsetting advantages in that they are highly flexible, mobile and adaptable to many different mining plans.

Ever since the beginning of use of substantial numbers of continuous mining machines in the early 1950's, mining machine manufacturers and mining companies have spent a great deal of money and engineering time and talent in trying to develop a conveyor system which would carry coal away from the face continuously as fast as the biggest continuous miner could produce it, and yet be as flexible and adaptable to different mining plans as shuttle cars.

The following four categories represent the concepts for continuous coal transfer that have any significant current use in United States underground coal mines:

A. Bridge conveyor-bridge carrier systems.
B. Extensible belt conveyor systems.
C. Flexible conveyor belt systems.
D. Cascading conveyor systems.

The term "significant current use" does not mean that any large proportion of coal mined is conveyed by these systems. The combined total of all of the operating continuous face haulage systems from the above four categories represents only a very small percentage of the underground coal mining activity in the United States. As pointed out above, the predominant method for moving coal from the face is by shuttle car and probably will remain so until a better continuous system is available. The four categories listed above include the systems that are actually running with some degree of success in mines today, and that are, for the most part, available as production items.

Interest in continuous face haulage is very strong among coal companies, much more so that would be indicated by the number of continuous face haulage systems in use. The relatively few mines that are operating these systems are spending a great deal of effort to make them work effectively. Many companies that do not have continuous face haulage systems in their mines yet are watching the various developments in continuous face haulage with interest.

There is also considerable interest in continuous face haulage among mining machine manufacturing companies. Most of the systems running in mines currently are relatively new designs, although generally they represent concepts that are not new. With the exception of one or two small mining machinery manufacturers, continuous face haulage products do not represent a large portion of overall sales. However, there seems to be a general feeling that the potential market may be substantial if acceptable machinery can be developed.

Because the present invention is a substantial step forward in the development of continuous transfer of coal from a mining machine, each of the above four categories of systems now in actual use will be described briefly.

A. Bridge Conveyor-Bridge Carrier Systems

These are the most widely used continuous face haulage systems in the United States. However, less than 200 such systems are operating, about half being conveyor belt designs and half conveyor chain designs. These consist either of three-unit, or five-unit series, depending on the distance between the face and the room conveyor, all arranged in cascade relation. The three-unit series has a first bridge conveyor attached to the tail conveyor of a continuous miner or a loading machine, with the outbye end of that first bridge conveyor resting on a carriage that travels back and forth along the inbye end of a wheel-mounted mobile bridge carrier. The outbye end of the mobile bridge carrier supports a second bridge conveyor whose outbye rests on a carriage or dolly that runs back and forth along the side frames of the room conveyor. The five-unit series extends behind the miner or loading machine in a similar manner, however, it has one extra bridge conveyor and one extra mobile bridge carrier to convey coal over a greater distance.

Mobile bridge carriers, sometimes referred to as mobile transfer carriers, have an orbitally movable conveyor belt or chain extending from one end to the other. They are ground-supporting and self-propelled, one example being the mobile transfer carrier C shown in U.S. Pat. No. 3,782,536 of David Toney, assigned to the present assignee. Bridge conveyors are illustrated in that same patent as units B and D and are characterized by their opposite ends being pivotally or variably telescopically supported on adjacent units.

Bridge conveyors were used prior to mobile bridge carriers. Bridge conveyors were introduced about 1950 for use between mining machines and room conveyors. Mobile bridge carriers were introduced about 1960 for use alternatively with bridge conveyors to extend the reach of the system and to convey around corners. The three-unit and five-unit systems are used respectively to mine three-entry and five-entry development plans, in each case the fixed floor conveyor being in the middle entry. Most applications are in coal seams ranging from 26 to 48' thick where they provide increased productivity over shuttle cars because of the reduced carrying capacity of shuttle cars when made in low heights for use in such thin seams.

A disadvantage of these conventional bridge conveyor-bridge carrier systems is the personal attention and manpower required to operate the tramming controls on the mobile bridge carriers each time they have to be moved to follow the mining machine.

B. Extensible Belt Conveyor Systems

These were also developed in the early 1950's and were characterized by a stationary head section with belt storage for up to 100 feet of belt, a movable tail piece which could be moved forward and backward to follow a mining machine as belt was taken from or added to a belt storage in the head section, and a number of light support frame for carrying and return roller assemblies between the head and tail sections.

By way of example, one of these extensible conveyors is disclosed in Craggs et at U.S. Pat. No. 2,862,604. Possibly as many as 200 extensible conveyors of this general type were made in the 1950's and early 1960's. Their use hAS declined and there are very few of them still operating. One disadvantage which limited their use substantially was that they used a single length of belting which had to extend in a perfectly straight line between the head and tail sections, otherwise the belt would de-train and become damaged. This, of course, made it impossible to work around corners. Undulating bottom was also a problem.

C. Flexible Conveyor Belt Systems

Flexible conveyor belt systems are continuous belt conveyors that can operate along a curved or serpentine path. One example is shown in Payne et al U.S. Pat. No. 3,707,218 issued to The Serpentix General Corporation. Most of the ideas along this line show the conveyors as bottom-supported but a few are roof-supported and may be movable as along a roof-mounted monorail. As an underground conveyor this system has not yet demonstrated any practical utility. Only three systems are believed to be in existence, all on an experimental basis.

D. Cascading Conveyor Systems

This category of continuous face haulage systems convers several concepts that have been proposed, a few of which have been made and tried out in coal mines, but none of which have been developed into workable systems.

These are characterized as a series of relatively small, individually driven conveyors, usually wheel-mounted and interconnected so that they operate as a train. The outbye ends of each conveyor in the series are elevated to discharge onto the next conveyor in the line. The articulation at the connection points between conveyor units give the required flexibility to negotiate turns and accommodate undulations in the bottom.

Bridge conveyors and bridge conveyor-bridge carrier systems, described under A above, are also cascade conveyors, in a literal sense, but they have been listed in a separate category above because they have been developed into workable systems that continue to be manufactured and used in substantial quantities.

Examples of cascade conveyors are shown in Hymaster U.S. Pat. No. 3,301,599, Towles U.S. Pat. No. 3,231,064, Moon U.S. Pat. No. 2,948,552, and Milik U.S. Pat. No. 2,923,398.

The cascading conveyors which involve a series of individual articulately interconnected units transferring coal successively from one to the other have had no significant success. As far as is known, no new ones are being manufactured today and the few which were actually manufactured and tried never got beyond the experimental stage. No one reason is believed responsible for their failure. Some had tramming problems, some did not have enough capacity to justify the huge investment involved, some did not maintain proper level in undulating bottom, some took unreasonable amounts of manpower to keep them in workable alignment, some were difficult to advance or retract with the mining or loading machine, and all were complex.

Summarizing, the only cascade conveyor systems which have been even modestly successful in providing continuous haulage from a mine face have been those listed under category A above. These, however, have all been based upon the use of one or more mobile bridge carriers. However, a mobile bridge carrier is a wide, long machine and oftentimes is diffucult to turn in the limited space available. As a consequence, systems in this category have relatively limited flexibility in working rolls and making turns.

SUMMARY OF THE INVENTION

A general object of the invention is to provide a mobile conveyor system for continuously conveying material from a movable loading position such as a mine face to a relatively fixed remote delivery position such as a mine panel belt or room conveyor.

An important object is to provide such a mobile conveyor system including a series of longitudinally movable cascade conveyor units in which one or more have power driven tramming means automatically actuated in response to movement of adjacent conveyor units.

Another object is to provide such a mobile conveyor system in which the power driven tramming means is automatically actuated in response to relative or lost motion movement between adjacent conveyor units.

Another object is to provide such a mobile conveyor system in which the power driven tramming means of successive cascade conveyor units are independently, automatically actuated in response to movements of their immediately adjacent conveyor units, enabling the system to extend or contract with an advancing or retreating mining machine, to continuously convey mined material from an advancing or retreating mine face.

Another object is to provide such a mobile conveyor system in which two adjacent conveyor units are telescopically lapped and relatively movable to vary the telescopically lapped relation within a predetermined range between minimum and maximum limits, and to automatically actuate the power driven tramming means of one of those conveyor units in response to relative movement of the other of said conveyor units within such predetermined range.

Another object is to provide such a mobile conveyor system in which the two adjoining conveyor units at the outbye end have a horizontally pivotable, non-telescoping interconnection, a ground-engageable skid at such interconnection, and spring biasing means urging those two adjoining units into alignment.

Another object is to provide such a mobile conveyor system in which the inbye and outbye units of such series are bridge conveyors and each intermediate unit is supported on a single pair of steerable self-powered wheels and ground-stabilized by a three-point support including such two wheels and one end of the unit resting on the ground.

Another object is to provide a wheel-supporting arrangement for such a conveyor unit in which the wheels are separately vertically adjustable to level the conveyor unit in non-level mine bottom.

Another object is to provide an improved wheel support for each conveyor in which a pair of steerable, independently powered wheels are carried in subframes which are independently vertically adjustable on opposite sides of a main conveyor frame, the wheels being maintained in upright positions through a substantial range of vertical adjusted positions by a plurality of parallel bars connected at their ends in parallelogram relation to the main frame and to the corresponding subframes respectively.

BRIEF DESCRIPTION OF THE DRAWINGS

FIG. 1 is a plan view of a mine showing a series of elongated longitudinally movable cascade conveyor units illustrating one form of mobile conveyor system according to the present invention;

FIGS. 2 and 2A are inbye and outbye end portions respectively of an intermediate conveyor unit embodying one form of the present invention as seen along lines 2/2A—2/2A of FIG. 1;

FIGS. 3 and 3A are top views of FIGS. 2 and 2A respectively;

FIG. 4 is an enlarged fragmentary vertical cross-section of FIG. 2 taken generally along line 4—4;

FIG. 5 is a view generally similar to FIG. 4 illustrating a leveling feature of the invention;

FIG. 6 is a fragmentary prespective view of that portion of the assembly shown in FIGS. 4 and 5 with the wheels, wheel drive motors and hubs removed for clarity;

FIG. 7 is a composite vertical cross-sectional view of the inbye end portion of unit C, and the carriage 32 riding on it, as seen along discontinuous section line 7—7 in FIG. 2, certain parts being phantomed and omitted for clarity;

FIG. 8 is a schematic hydraulic diagram showing the means for automatically tramming one conveyor unit in the system in response to movement of an adjacent conveyor unit;

FIG. 8A is a fragmentary view of FIG. 8 showing the tramming valve lever in a deflected operating position;

FIG. 9 is a fragmentary enlarged view of FIG. 2;

Like parts are referred to by like reference characters throughout the figures.

DETAILED DESCRIPTION OF A PREFERRED EMBODIMENT

Figure 10:
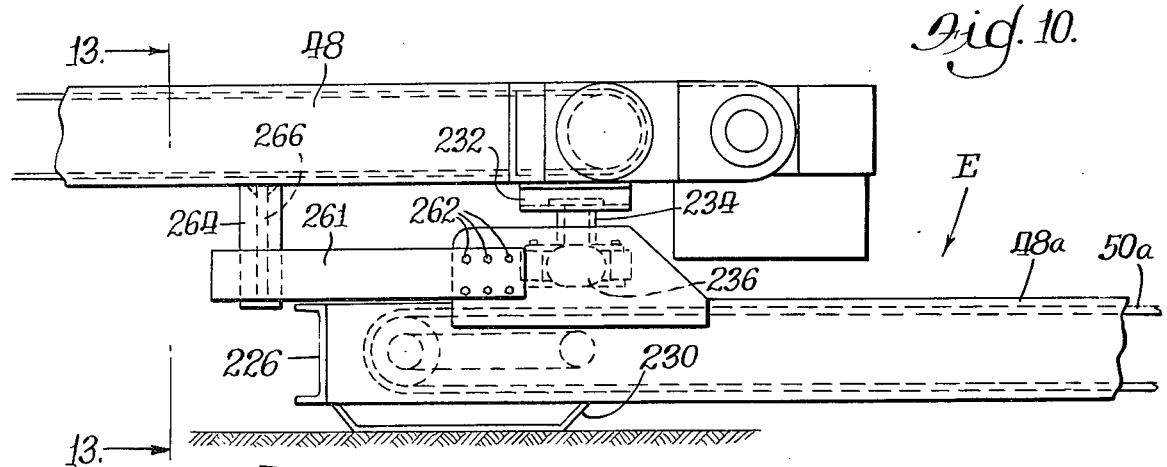
FIG. 10 is a fragmentary enlarged view of FIG. 1 taken along line 10—10 showing spring biasing means for urging the adjoining pair of conveyor units at the outbye end of the conveyor system into alignment, and illustrating skid means for supporting the interconnection between the two units.
Figure 11:
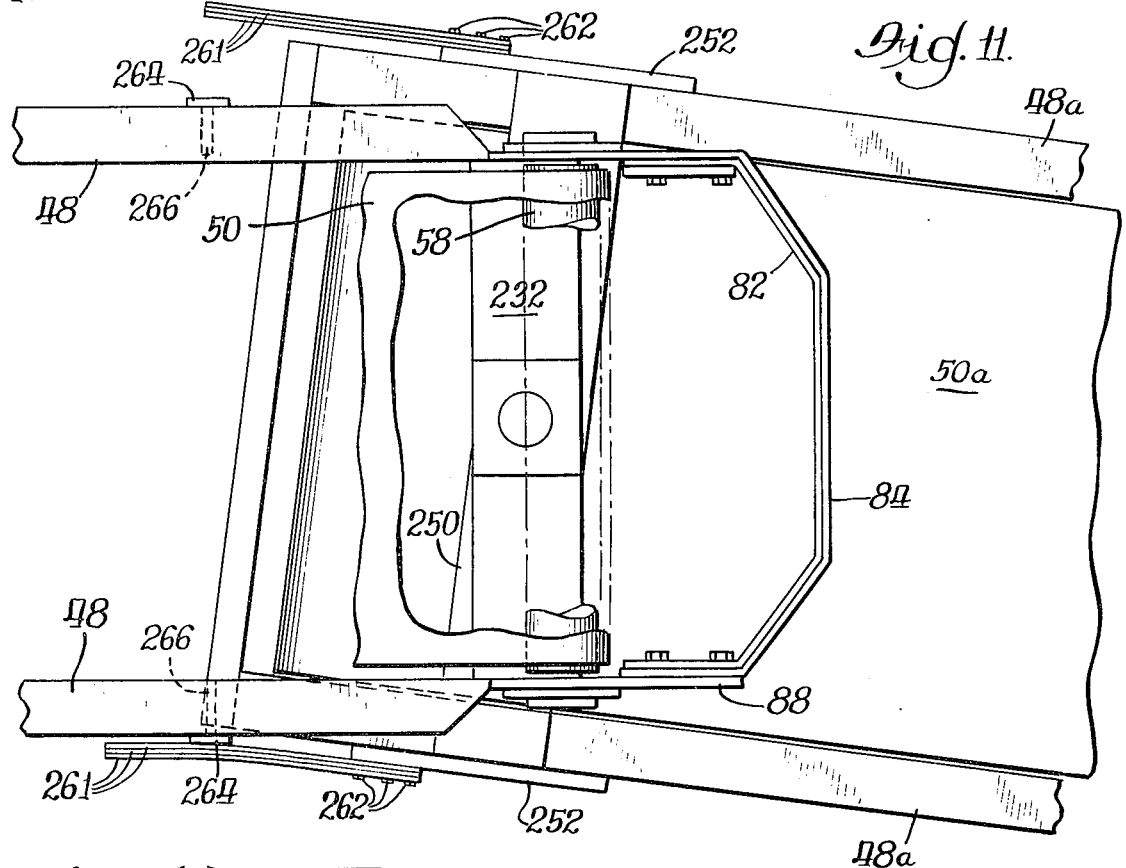
FIG. 11 is a top view of FIG. 10.

FIG. 1 illustrates a coal mining operation in which three rooms 20, 22 and 24 are driven up together, and a mobil conveyor system in accordance with the present invention conveys mined coal away from a face as fast as it is produced.

A continuous miner A is shown at face 26 of room 20. Alternatively, it may be loading machine which follows a continuous miner or a conventional cutting and shooting operation. Coal won at the face is conveyed outbye, that is, away from the face, continuously as produced, by a series of cascade conveyor units, including a first bridge conveyor B, a pair of identical self-tramming wheel-mounted conveyor units C and D, a second bridge conveyor E, and a portable belt conveyor F. The latter discharges onto a suitable output conveyor (not shown) which discharges into other conveyors or mine cars (not shown) for transport to the outside.

The first bridge conveyor B has its receiving end 28 pivoted beneath or otherwise positioned to receive mined material from the discharge end of mining machine conveyor. Bridge conveyor B may be conventional, having its discharge end mounted on a wheeled carriage or dolly 32 which moves longitudinally back and forth on side rails 34, 34 of the conveyor unit C which as stated, may be, and is illustrated as, similar to conveyor unit D. Longer conveyor systems according to the present invention, may have more than two of such units C and D.

The conveyor units C and D will first be described generally in conjunction with the overall mining plan shown in FIG. 1. Each is self-propelled on running gear shown as a single pair of self-powered steerable wheels 36, 36 carried by a tramming frame generally designated 35. A central main conveyor frame 37 on Unit C supported on tramming frame 35 has a conveyor belt 50 which receives the discharge from bridge conveyor B at any position along the length of its receiving section depending on the degree of telescopic lap between B and C as determined by the position of the bridge conveyor carriage 32 on unit C. Likewise, a similar conveyor belt 50 on unit D receives the discharge from unit C at any position along the length of its receiving section depending on the degree of telescopic lap between C and D as determined by the position of the carriage 32 on unit D.

The second bridge conveyor E is essentially a counterpart of B having a receiving end 38 pivotally mounted in fixed lapped relation beneath the discharge end of unit D. A wheeled dolly or carriage 32 at the discharge end runs along side rails 41, 41 of the portable belt conveyor F. The latter may be of the kind disclosed in Nelson U.S. Pat. No. 3,762,532 issued Oct. 2, 1973.

The self-tramming, wheel-mounted, mobile conveyor unit C of the present invention, which with a similar unit D are shown only generally in the operating environment of FIG. 1, will now be described in detail.

As shown in FIGS. 2, 2A, 3 and 3A, the conveyor unit C comprises an elongated conveyor frame 37 on a wheel-supported tramming frame 35.

The conveyor frame 37 has a receiving section 42 and a discharge section 44. The conveyor frame has a pair of horizontally spaced vertical side plates 46 in the receiving section, these being a continuation of a pair of horizontally spaced side channel members 48 in the discharge section. Plates 46 are rigidly fixed as by welding or bolting connection to the respective channel members 48.

The conveyor belt 50 is trained for orbital movement, in a conveying reach 52 and a return reach 54, between inbye and outbye idler pulleys 56 and 58. These are rotatably journalled between the receiving section plates 46, 46 and extension plates 88, 88 of section channels 48, 48, respectively. The conveying reach is supported on a flat plate 60 (FIGS. 3, 3A, 4 and 5) welded between the plates 46, 46 and channel members 48, 48. The return reach is supported at intervals on curved cross plates 62 (FIGS. 4, 5 and 6) likewise welded between the side frame members 46, 46 and 48, 48. Additional transverse support is provided for the frame by horizontal struts 64 (FIGS. 4, 5 and 6) welded between the side frame members. As shown in FIGS. 2 and 3, the conveyor belt 50 is driven by a pair of motors 66 which are connected to opposite ends of a conveying reach drive pulley 68 through right angled gear reducers 70. Snub pulleys 72 and 74 provide sufficient frictional wrap about the drive pulley to move the belt under load.

As shown in FIGS. 2, 2A and 7, each side plate 46 at the inbye end of the receiving section is, in the present embodiment, the vertical web of an angle member 76 having a horizontal web 78. The inbye end of web 78 will rest on the ground during operation as shown in FIGS. 2 and 2A, for similar conveyor units C and D. A transverse inbye end member comprising an upwardly open channel 80 is fixed as by welding or bolting (not shown) across the inbye ends of angle member 76 to rigidify the receiving section and to provide a strong forward bumper.

As shown in FIGS. 2A and 3A, the outbye end of the discharge section 44 has a rubber-like deflector 82 spaced from the discharge pulley 58 and supported by a generally U-shaped horizontal bracket 84 connected by bolts 86 to extension plates 88 between which the discharge pulley 58 is journaled.

The deflector arrangement just described is duplicated at the discharge end of first bridge conveyor B as shown in FIG. 2, and it may be duplicated at the discharge end of conveyor unit D and second bridge conveyor E, in each case to facilitate the cascade transfer of mined material through the carriage or dolly 32 previously mentioned.

The carriage 32 may be of any conventional form in which the discharge end of one conveyor is variably telescopically lapped with the receiving end of another conveyor, to facilitate cascade transfer of material through a range of back and forth positions on the receiving conveyor and through ranges of relatively horizontally swung and vertically tilted positions.

The carriage 32 comprises in plan view a generally U-shaped plate 90 (FIG. 17) having a C-shaped slot 92 and a central throat opening 94 bridged by vertical arch-shaped plate 96 welded across the open discharge end of the plate 90. Approximately one-half of the upstanding plate 96, illustrating its arch-shaped contour, is shown in FIG. 7.

Figure 17:
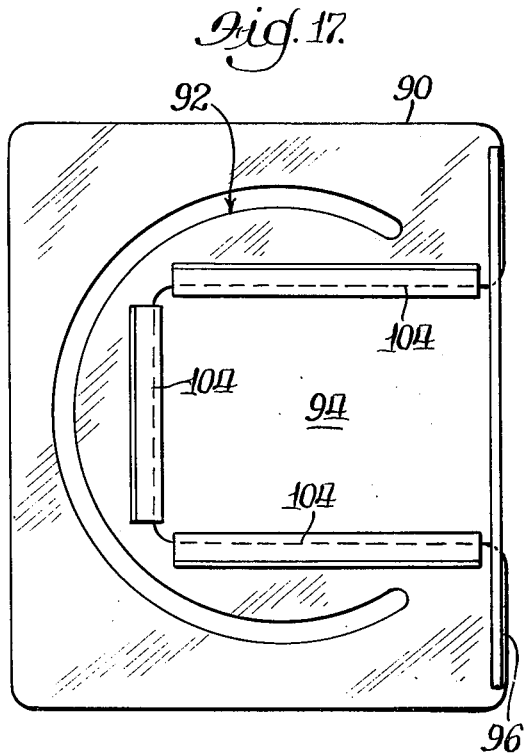
FIG. 17 is a top plan view of a base plate shown as part of the carriage assembly in some of the other views.

Referring further to FIG. 7, the carriage 90 has a pair of V-grooved wheels 98 on each side, each rotatable about an axle pin 100 held between a pair of depending brackets 102 welded to the underside of the plate 90. The pair of wheels on each side are guided for longitudinal movement on one of the side rails 34 of each of which, as shown in FIG. 7, is an inverted angle member welded to the top face of web 78. As shown in FIGS. 7 and 17, a series of metal strips 104 are welded at a diagonal angle along the inner periphery of the plate 90 defining the throat 94. As shown in FIGS. 2, 3 and 7, a wide rubber strip 106 is mounted as by bolts 108 onto the strips 104 and the bottom edge of this rubber strip extends down into or near touching relationship with the belt conveying reach 52 to constrain the transferred material to the center of the belt and minimize loss along the edges.

To hold the wheels 98 down on the rails 34, a series of hold-down rollers 110 (FIG. 7) are provided on each side. Each is rotatably fastened about a pin 112 carried by a depending bracket 114 also welded to the underside of the plate 90.

Figure 15:
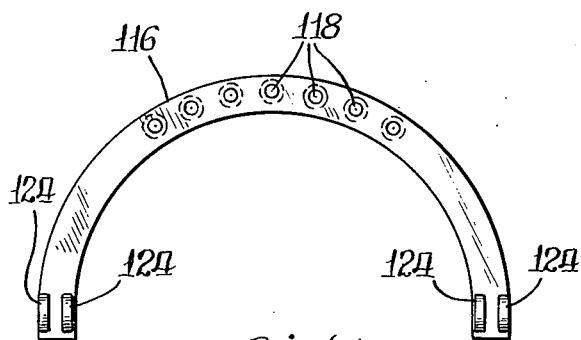
FIG. 15 is a top plan view of a swivel yoke shown as part of the assembly in some of the other views.
Figure 16:
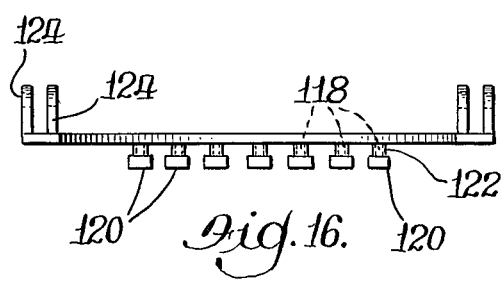
FIG. 16 is an end view of FIG. 15.

Referring to FIGS. 7, 15 and 16, a semicircular yoke 116 has a plurality of depending, headed pins 118 each with a head 120 supporting a roller 122. The yoke is assembled on the plate 90 as shown in FIG. 7, with the rollers 122 riding in the C-shaped slot 92. The yoke has at each end a pair of upstanding ears 124, each pair having a hinge pin 126 pivotally connecting it to a downwardly extending ear 128 on the corresponding extension plate 88.

With the construction described above, each carriage 32 can roll back and forth on the side rails or tracks 34 and transfer material from unit B to C, or from C to D throughout a range of longitudinal movement. Further, throughout this range, unit B may be swung horizontally with respect to unit C, and C may be swung with respect to D, up to about 90° as enabled by the arcuate movement of the yoke 116 about the slot 92. Further, up and down tilting movement between the conveyors is enabled by the pivotal connections at the hinge pins 126 to accommodate uneven ground contour on the mine bottom.

A pair of shock absorbers 130 are mounted on the top plates 132 of the receiving section in position to engage to carriage plate 96 and prevent damage if it moves rapidly in the outbye direction. And the carriage has another pair of shock absorbers 134 mounted beneath the plate 90 and engageable with the transverse end member 80 to absorb shock and prevent damage if it overruns rapidly in the inbye direction.

As shown in FIGS. 2 and 7, the conveyor belt 50 is tensioned by spring loading the inbye pulley 56. To this end, the pulley shaft 136 shaft 136 is guided for back and forth movement in horizontal slots 138 in the webs 46, and a push rod 140 is urged in an inbye direction against each end of the pulley shaft by suitable biasing means such as the spring 142.

As shown in FIGS. 2, 2A, 3 and 3A, the tramming frame 35 is located intermediate the main conveyor frame 37. As best shown in FIGS. 4, 5 and 6, the tramming frame 35 includes a pair of independent wheel-supported tramming subframes 144, one on each side. Each subframe 144 comprises a lower horizontal plate 146 and an upper horizontal plate 148 connected by a pair of vertical struts 150. The struts are welded at their bottom ends to the plate 146 and fastened to top horizontal plate 148 by cap screws 152. The plates have vertically aligned bearing openings 154 and 156 for the wheel kingpin bearings to be described.

A rubber tired wheel 158 is rotatably mounted on a hub 160 mounted by bolts 162 to a pivotal steering frame 164. This pivotal steering frame is best shown in FIGS. 4 and 5 and comprises a vertical plate 166 through which the bolts 162 extend, and a pair of horizontal upper and lower plates, 168 and 170 respectively, all preferably welded or cast into a single unitary assembly. This steering frame 164 is pivotally mounted between the plates 146 and 148 about a vertical kingpin axis X—X. For this purpose, the steering frame 164 has upper and lower axially aligned kingpin members 172 and 174 fastened to the upper and lower plates 168 and 170 and mounted for pivotal movement within upper and lower bearing members 176 and 178, respectively. The bearing members are fastened to the upper and lower plates 148 and 146 by cap screws 180 and 182, respectively.

One of the unique features of this invention is that a stable three-point ground support is provided for each unit C and D, two points being the wheels 158 and the third point being the ground-engaging inbye end of web 78 described above in connection with FIGS. 2 and 2A.

Each wheel 158 is independently driven by its own motor and step down gearing. This includes a hydraulic motor (designated M1 and M2 on the respective sides of the machine, for consistency with the hydraulic diagram in FIG. 8) and first and second stage step down gearing 184 and 186, respectively, all mounted on the inside of the hub 160 and pivotal therewith.

Each tramming subframe 144 is supported on the main conveyor frame 37 for independent vertical adjustment to maintain the conveyor frame level on non-level bottom and to adjust the working height of the conveyor frame. This is illustrated in FIGS. 4 and 5 where it will be noted that the wheel is maintained precisely upright throughout the entire range of vertical adjustment, by reason of the parallel arm support and vertical adjustment means now to be described.

Two vertical plates 188 are attached as by welding between and below the side channel members 48.

Two pairs of identical parallel bars or arms are connected in parallelogram arrangement between upper and lower pivot pins 196 and 198 on each vertical strut 150, and upper and lower pivot pins 200 and 202 on the near side of the adjacent vertical plate 188. Each pair of parallel bars may be arranged for slidable engagement with opposite fore and aft surfaces of vertical plates 188 to thereby provide fore and aft, stable support for the wheel means.

Adjustable elevating means is provided between each tramming subframe and the corresponding side of the main conveyor frame 37. Referring to FIGS. 4, 5, 6 and 9, this comprises a pair of vertical jacks J, each with a cylinder portion 204 and a rod portion 206. The jacks J are located fore and aft of the tramming subframe 144, shown in FIGS. 4, 5 and 9 each having upper and lower ball joint connections 208 and 210, respectively, with the corresponding side channel member 48 and lower plate 146. The wheel assembly opposite the one shown in FIGS. 4, 5 and 9 has a pair of elevating jacks identical to jacks J, but for clarity these are designated J1 in the hydraulic diagram of FIG. 14.

The wheels 158 are steerable about the kingpin axes X—X of kingpins 172, 174 by conventional kydraulic power steering means, which do not comprise any part of the present invention so will not be described in detail. Briefly, however, the wheel hubs 160 have steering arm extensions 212 (FIG. 3) which are interconnected by conventional linkage means generally designated 214 and actuated by power cylinders 216 in response to steering movements of a wheel or tiller (not shown).

Hydraulic power for steering, elevating, and tramming functions is provided by pumps P, P1 and P2. Pumps P and P1 may be connected in parallel as shown in FIG. 8 where the automatic tramming operation is schematically shown. Pump P2 powers both the elevating and steering functions according to the schematic diagram of FIG. 14. An electric motor 218 drives both pump P and P2 and motor 220 drives pump P1. Electrical and hydraulic controls, as required, may be provided in control cases 222 and 224.

Before describing the operation of the individual conveyor units, and the overall mobile conveyor system, the special articulated interconnection between adjoining units D and E will be described. This provides a fixed lapped relation between the two units, although articulated so they can transfer material when relatively angularly disposed, and there is spring means biasing them toward alignment, and ground engaging skid means tending to hold them non-aligned when required.

For this interconnection, see FIGS. 1, 10, 11, 12 and 13. Both bridge conveyor units B and E may be conventional and do not require any detailed description, each comprising an elongated frame having a pair of side channel members 48a similar to channel member 48, and a pair of transverse end members, at opposite ends, illustrated by the cross beam 226 in FIG. 10. The outbye of unit E may be similar to the outbye ends of units B and C and may discharge through a carriage or dolly 32 similar or identical to the ones already described. Each unit B and E has a conveyor belt 50a similar to belt 50 and trained for orbital movement between inbye and outbye pulleys, each belt being driven by motor means generally designated 228 in FIG. 1.

Refer now to FIGS. 10–13 for details of the interconnection between units D and E.

Figure 13:
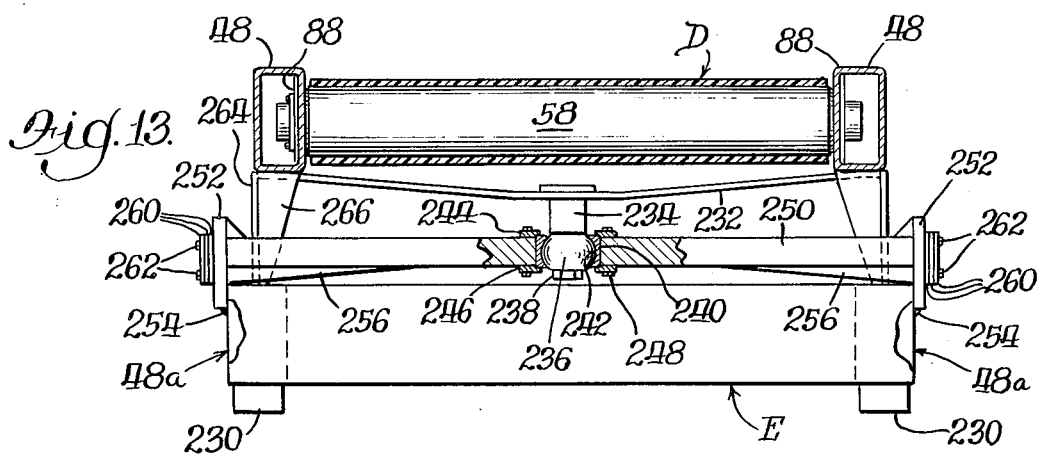
FIG. 13 is a vertical cross-sectional view of FIG. 10 taken generally along line 13—13.

The inbye end portion of unit E has a pair of ground engaging skids 230, 230 on the under sides of the frame members 48a. As shown in FIG. 13, a transverse strut 232 is fixed, as by welding, across the under sides of frame members 48 on the conveyor unit D. A depending post 234 is fastened to the under side of the strut 232 and carries a ball 236 held by a bolt 238. The ball is fitted for universal pivotal movement within a spherical bushing 240 having an internal, matching, spherical engaging surface 242. The bushing is held by retainer plates 244 and 246 and bolts 248 in a center aperture of a transverse strut 250. That strut terminates in a pair of short end plates 252 fastened, by welding as at 254, to the outer side walls of side channel members 48a of conveyor unit E. A reinforcing gusset 256 is provided at both ends of the strut 250 and is welded respectively to the ends of the latter and to the corresponding end plates 252.

Spring means 258 urge units D and E into alignment. That spring means in the present instance comprises a stack of leaf springs 260, which are fastened to the outside of each plate 252 by means of bolts 262. In the normally straight ahead, aligned, position shown in FIG. 12, the spring assemblies 258 are spaced a distance A from a depending striker plate 264 which is welded to the bottom of each side channel member 48. To strengthen this striker plate, a gusset 266 is further welded to the inside of it and to the bottom side of the channel member 48 as shown in FIG. 10. The space A, on each side of the interconnection, makes possible some free or lost motion between the units D and E immediately adjacent the straight ahead, aligned position. To regulate the amount of this lost motion, a spacer 268 of suitable thickness may be added to the plate 264, as shown in broken lines in FIG. 12.

Thus, to avoid a corner at two intersecting entries, as shown in FIG. 1, units D and E may be angularly disposed as permitted by the articulation about the ball joint 236, and the units will stay in that position until they are moved, because of the ground engaging friction through the skids 230. However, the spring means 258 will urge them back into substantial alignment, depending on the size of spaces A, when series of conveyor units are moved inbye or outbye.

An important part of the present invention is the feature whereby individual conveyor units are automatically self-tramming to thereby follow the inbye and outbye movements of the mining machine A, both when it is advancing and retreating. This eliminates a large amount of labor, effect, and time formerly required for moving a conveyor system to follow a mining machine. This automatic tramming feature will now be described.

Refer to FIGS. 2 and 8. Mounted on the web 78 of the angle member 76 at the inbye end of unit C (and unit D, and any other similar self-tramming units used) is an automatic hydraulic control valve 270. Referring to FIG. 8, this valve has a bore 272 and a spool having a pair of cylindrical heads 274, 276 mounted on a rod 278 and centered as shown by springs 280, 282. The rod is pivotally connected at 281 to an operating lever 284 which is pivotable about pin 283 on valve body extension 285 between the solid line "neutral" position to the "forward" and "rearward" positions shown in broken lines. The lever 284 is engageable by one or the other of two depending dogs 286 and 288 longitudinally spaced apart on the bottom side of carriage plate 90.

The valve lever 284 is made flexible to enable the dogs 286 and 288 to overrun the optimum forward and rearward positions for the valve without damage to the parts. To this end, the lever comprises two sections 284a and 284b flexibly interconnected by spring 284c. As shown in FIG. 8A, this enables the lever to bend at the spring 284c if the dog 286 overruns the optimum forward position for the lever.

In operation, as the bridge conveyor unit B is moved inbye by the mining machine to which it is attached, when the dog 286 moves lever 284 to its forward position, fluid under pressure from parallel-connected pumps P and P1 will pass from supply line 290, into bore 272, through pressure line 292 which is uncovered by head 274, into the parallel-connected tramming hydraulic motors M1 and M2. Return flow from the motors will pass through line 294 which is uncovered by head 276, into bore 272 and thence back to tank T through return line 296. The motors M1 and M2 will, when so actuated, move unit C in an inbye direction until lever 284 is completely released from dog 286 and returned to its solid line neutral position shown in FIG. 8 in which both pressure/return lines 292/294 are blocked by the respective heads 274 and 276.

As the mining machine A advances and pulls the bridge conveyor B inbye, the above described advance of unit C will be repeated each time the dog 286 deflects the lever 284. The conveyor unit C will therefore follow the mining machine A automatically, precisely in the amount required, without any necessary attention of human operators. And the conveying of mined material may continue throughout the entire operation, even while the conveyor unit are advancing if desired.

As conveyor unit C moves inbye to the position where its dog 286 (the counterpart of dog 286 on the carriage attached to conveyor B) deflects the valve lever 284 on conveyor unit D, this will automatically energize the tramming motors on unit.D and cause it to advance itself in the same manner. D will draw unit E behind it and it, in turn, will cause the carriage 32 attached to it to move in an inbye direction along the belt conveyor F.

If additional self-powered units such as C and D are employed, as for example in a much longer system, the operation will be exactly the same in which each individual self-powered unit will advance as required in response to movement of the adjacent unit.

Conversely, the entire conveyor system will move in exactly the same way, in an outbye direction, in response to continued outbye movement of the mining machine. When the mining machine A retreats, moving the bridge conveyor B outbye to the position where dog 288 deflects lever 284 to the rearward position, fluid under pressure will flow from supply line 290, past head 276 into pressure line 294 to the motors M1 and M2, returning through line 292, past head 274 and back to tank through return line 298. This will actuate the tramming motors M1 and M2 on conveyor unit C causing it to move itself outbye until lever 284 returns to upright neutral position and releases the dog 288. This will be repeated as the mining machine continues to retreat, both for the unit C, and the D, the latter in that case moving the attached bridge conveyor unit E with its carriage 32 outbye along the unit F.

The spacing between the dogs 286 and 288 is not critical but, to prevent nuisance or unintended actuation of tramming motors when the units are being manually adjusted or elevated, I prefer to have something in the neighborhood of one to two feet spacing between them.

Figure 14:
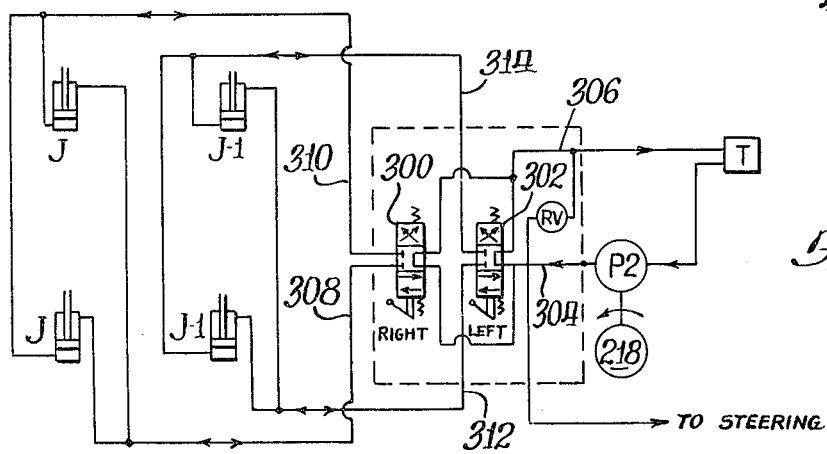
FIG. 14 is a schematic hydraulic diagram showing the arrangement for separately controlling the elevating jacks on opposite side of one of the conveyor units to maintain the main conveyor frame level.
Figure 12:
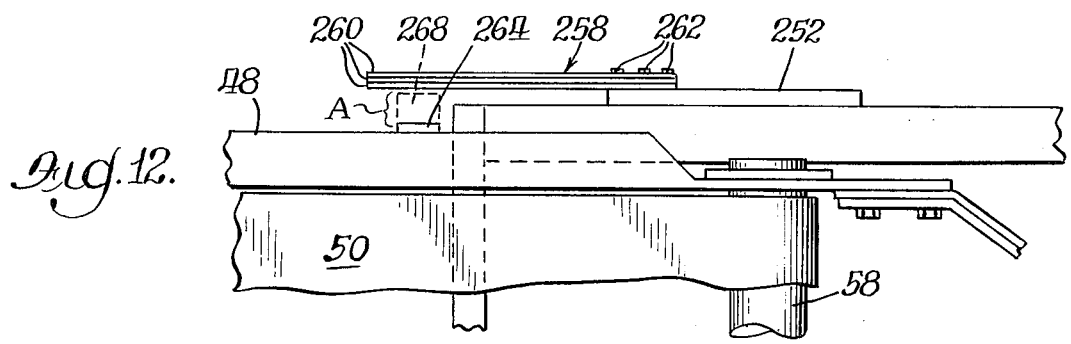
FIG. 12 is a fragmentary view of FIG. 11 showing the two adjoining coveyor units at the outbye end of the system in spring-biased alignment.

Refer to FIG. 14. This shows a schematic hydraulic diagram illustrating the selective elevation of one side or the other of one of the units C and D to adjust the wheels to maintain the conveyor frame level on uneven mine bottom. Two such adjusted positions are shown in the drawings, FIG. 4 illustrating a level mine bottom and FIG. 5 illustrating adjustment for a non-level mine bottom.

Referring back to FIG. 14, valves 300 and 302 are schematic representations of three-way valves which may be similar to that shown in FIG. 8. Valve 300 actuates elevating jacks J described in connection with FIGS. 4, 5 and 6. Valve 302 actuates the elevating jacks designated J1 which are identical but on the other side of the machine. Supply line 304 from pump P2 connects to the input ports of both valves 300 and 302. Return line 306 connects both valves to the tank T, it being understood that line 306 is a simplified representation of two lines comparable to 296 and 298 in FIG. 8. Often in an actual valve construction, these two lines will be combined within the valve body into a single return line such as that indicated 306. Activation of the handle for valve 300 to pressurize line 308 will lower both jacks J; conversely, actuation to pressurize line 310 will raise them. Similarly, actuation of valve 302 to pressurize line 312 will lower both jacks J1; and actuation to pressurize line 314 will raise them. This adjustment need be made only as often as the contour of the mine bottom changes sufficiently to affect the level of the conveyor.

While one form in which the present invention may be embodied has been shown and described, it will be understood that various modifications and the variations thereof may be effected without departing from the spirit and scope of the invention as defined by the appended claims.

The embodiments of the invention in which an exclusive property or privilege is claimed are defined as follows:

1. In a mobile conveyor system for mining having a series of elongated mobile conveyor units articulately interconnected in cascade relationship with each of said units positioned to discharge onto a succeeding unit for conveying material from a movable source to a remote stationary floor conveyor, each mobile conveyor unit having a conveyor frame with an endless conveyor element trained for orbital movement between pulleys at opposite ends and driving means for said conveyor element, at least one of said mobile conveyor units intermediate the end units of said series comprising:

tramming frame means intermediate the receiving and discharge ends of the conveyor frame of said one conveyor unit including a pair of separate and independent tramming subframes on opposite sides of said conveyor frame, each subframe being separately guided for independent up and and down movement relative to said conveyor frame and having a single mine-bottom-engaging wheel comprising the sole ground support for said subframe and enabling said one conveyor unit to tilt freely up and down as a unit about said wheels;

the receiving end of said conveyor frame engaging the mine bottom to provide, with said two wheels, a three-point ground-stabilized support for the entire said conveyor frame, the receiving end portion of said conveyor frame having track means located between said receiving end and said wheels;

said conveyor frame comprising with the endless conveyor element and the pulleys associated therewith, a single integral assembly which is vertically tiltably adjustable, as a unit, independently of the tramming frame means, about the point of engagement of its receiving end with the mine bottom, and is rockably adjustable, as a unit, independently of the tramming frame means, about a longitudinal axis extending along the length of the endless conveyor element;

power-actuated elevating means acting between each of said subframes and the corresponding side of said conveyor frame, either of said elevating means when independently actuated being effective to rockably adjust said conveyor frame about said longitudinal axis and thereby adjust the transversely level condition thereof, both of said elevating means when simultaneously actuated being effective to vertically tiltably adjust the entire said conveyor frame about the said point of engagement of its receiving end with the mine bottom and thereby adjust the height thereof relative to the tramming frame means;

a carriage connected to the adjacent inbye mobile conveyor unit and movable thereby back and forth on said track means along the so-stabilized receiving end portion to provide a connection between said one mobile conveyor unit and said adjacent inbye mobile conveyor unit enabling self-tracking variable telescopic movement therebetween;

the discharge end portion having means for connection with an adjacent outbye mobile conveyor unit;

power tramming means for driving said wheels to self-propel said one mobile conveyor unit; and automatic control means operable in response to movement of the carriage by the adjacent mobile conveyor unit in one direction along the track means to actuate said power tramming means to move said one conveyor unit in the same direction.

2. In a mobile conveyor system, the combination of claim 1 in which said power tramming means comprises motor means supported on the tramming frame and connected to drive said wheels; and, said automatic control means comprises engageable elements carried respectively on the receiving portion of said one mobile conveyor unit and on said carriage means for automatically actuating said motor means in response to engagement of said elements to drive said wheels and move said one mobile conveyor unit relative to the carriage in a direction to disengage said elements.

3. In a mobile conveyor system, the combination of claim 2 in which said automatic control means includes means for automatically deactuating said motor means to stop said wheel means and stop movement of said one mobile conveyor unit in response to disengagement of said elements.

4. In a mobile conveyor system having a series of elongated mobile conveyor units articulately interconnected in cascade relationship with each of said units positioned to discharge onto a succeeding unit for conveying material from a movable source to a remote stationary floor conveyor, each mobile conveyor unit having a conveyor frame with an endless conveyor element trained for orbital movement between pulleys at opposite end and driving means for said conveyor element, the outbye unit of said series of elongated mobile conveyor units is variably telescopically lapped at its discharge end with said stationary floor conveyor for transferring material to said floor conveyor throughout a range of movement of said outbye unit along said floor conveyor;

the adjoining unit of said series of conveyor units, which is immediately inbye said outbye unit, is ground-supported on a pair of reversible power-driven tramming wheels intermediate the ends thereof and has a horizontally pivotable non-telescoping drawbar connection to said outbye unit; and said connection between said outbye unit and said adjoining unit includes a ground-engageable skid constituting the only ground support for said outbye unit and includes spring means urging said outbye unit and adjoining unit into alignment enabling said power driven tramming wheels on said adjoining unit to move said outbye unit in either inbye or outbye direction along said floor conveyor.

5. In a mobile conveyor system for conveying mined material from a mobile mining machine to a remote floor conveyor, the combination of:

a series of elongated mobile conveyor units having articulated interconnections for relative horizontal swinging movement, in cascade relationship, with each of said units positioned to discharge onto a succeeding unit;

said series of conveyor units comprising inbye and outbye units and at least one intermediate unit;

said inbye and outbye units being bridge conveyors wholly supported at the ends thereof;

said intermediate unit wheel-mounted and self-propelled;

said inbye conveyor unit having means for positioning its receiving end beneath the discharge end of a conveyor on the mining machine for receiving mined material therefrom and for longitudinal movement with the mining machine;

the bridge conveyor comprising said inbye conveyor unit being in variable telescopically lapped relation with the adjacent intermediate unit, having its discharge end articulately connected to a carriage supported on the receiving end of the adjacent intermediate unit for movement between predetermined minimum and maximum limits of lapped relation;

the bridge conveyor comprising said outbye conveyor unit being in variable telescopically lapped relation with the floor conveyor having its discharge end articulately connected to a carriage supported for movement on the receiving end of the floor conveyor;

the articulated interconnection between the receiving end of said outbye unit and the discharge end of the adjacent intermediate unit having a fixed lapped relation and including spring biasing means urging said outbye unit and said adjacent intermediate unit into alignment when being moved;

said articulated interconnected having bottom-engaging skid means resisting said spring biasing means to hold said outbye unit and said adjacent intermediate unit in a selected position of non-alignment when stationary;

said intermediate unit having wheels on opposite sides intermediate the ends thereof, the receiving end of said intermediate unit being bottom-engageable to provide with said wheels, a stable three-point support therefor;

drive means for said wheels to propel said intermediate unit independently of and relative to said inbye unit to vary the lapped relation therebetween; and automatic control means responsive to movement of said carriage on the receiving end of said intermediate unit in one direction to actuate said wheel drive means to propel said intermediate unit a predetermined amount in the same direction.

6. In a mobile conveyor system, the combination of claim 5 including a plurality of said self-propelled intermediate units which are all substantially identical, each of which is in variable telescopically lapped relation with a succeeding one of said series of elongated mobile conveyor units, and each of which is automatically and independently movable a predetermined amount in one direction in response to movement of an adjacent unit in that same direction.

7. In a mobile conveyor system for mining having a series of elongated mobile conveyor units, articulately interconnected in cascade relationship, with each of said units positioned to discharge onto a succeeding unit for conveying mined material from a movable mining machine to a romote relatively stationary delivery position, each of said conveyor units having a main conveyor frame with an endless conveyor element trained for orbital movement between pulleys at opposite ends and driving means for said conveyor element, at least one intermediate conveyor unit between the end units of said series having improved tramming, supporting and leveling means comprising:

a tramming frame including a pair of tramming subframes on opposite sides of the main conveyor frame intermediate the ends thereof;

a single mine-bottom-engaging wheel carried by each said subframe comprising the sole ground support for said subframe and independently rotatable about an axis transverse to the main conveyor frame of said one intermediate units, and means for driving each said wheel to self-propel said conveyor unit;

wheel support means including elevating means connected between each said subframe and a corresponding side of said main conveyor frame providing independent vertical adjustment of said wheels to maintain said main conveyor frame in a transversely level condition on non-level bottom and to adjust the working height of the main conveyor frame, each said elevating means including power lift means acting between the subframe and main frame and a pair of vertically spaced parallel bar means pivotally connected at their ends in parallelogram relation to the main conveyor frame and to the corresponding subframe respectively to maintain said subframes and wheels in upright positions throughout their effective range of vertical movement; and the receiving end of said main conveyor frame being skidmounted on the mine bottom to provide, with the two wheels on the two subframes, a stable three-point ground support enabling said one intermediate unit to self-propel while so supported.

8. In a mobile conveyor system, a conveyor unit according to claim 7 in which said main conveyor frame includes a pair of transversely spaced elongated side rails interconnected on the underside at locations fore and aft of said wheels by transverse vertical plates, each said of vertically spaced parallel bar means having pivotal connections at their inner ends to a corresponding one of said vertical plates, a subtantial length of each of said pair of parallel bar means extending outwardly from said pivotal connections being swingable in vertical planes closely adjacent to vertical surfaces of said vertical plates, to limit deflection of said parallel bar means in a direction fore and aft of said main conveyor frame.

9. In a mobil conveyor system a conveyor unit according to claim 8 in which each of said pair of parallel bar means itself includes a pair of individual bars slidably engaging opposite fore and aft vertical surfaces of said vertical plates to thereby provide fore and aft stable support for said wheel means.

10. In a mobile conveyor system for mining having a series of elongated mobile conveyor units articulately interconnected in cascade relationship with each of said units positioned to discharge onto a succeeding unit for conveying material from a movable source to remote stationary floor conveyor, each mobile conveyor unit having a conveyor frame with an endless conveyor element trained for orbital movement between pulleys at opposite ends and driving means for said conveyor element, at least one of said mobile conveyor units intermediate the end units of said series comprising:

- a tramming frame intermediate the receiving and discharge end portions of said conveyor frame, the tramming frame including a pair of tramming subframes on opposite sides of the conveyor frame, each subframe being separately guided for independent up and down movement relative to the conveyor frame, said subframes having separate transversely spaced mine-bottom-engaging wheels, separate power actuated elevating means acting between the conveyor frame and each subframe respectively for separately adjusting the height of said wheels to adjust the conveyor frame to a transversely level condition while enabling longitudinal tilting adjustment thereof about the axes of said wheels;
- the inbye end of the receiving end portion of the conveyor frame being engageable with the mine bottom to provide, with the two wheels, a three-point, ground-stabilized support for said receiving end portion, said receiving end portion having track means located between said inbye end and said wheels;
- a dolly connected to the adjacent inbye mobile conveyor unit and movable thereby back and forth on said track means along the so-stabilized receiving end portion to provide a connection between said one mobile conveyor unit and said adjacent inbye mobile conveyor unit enabling self-tracking variable telescopic movement therebetween;
- the discharge end portion having means for connection with an adjacent outbye mobile conveyor unit;
- reversible motor means supported on the tramming frame and connected to drive said wheels; and
- automatic control means comprising operating lever means carried on one of two relatively movable members consisting of the receiving portion of said one mobile conveyor and said dolly, and dog means carried on the other of said relatively movable members, said lever means and dog means being engageable at opposite ends of a predetermined range of relative movement between said one mobile conveyor unit and said inbye conveyor unit, means for automatically actuating said reversible motor means in one direction or the other in response to engagement of said lever means and dog means at either end of said predetermined range of relative movement, to move said one mobile conveyor unit relative to the dolly in a direction toward the other end of said predetermined range of relative movement.

* * * * *

UNITED STATES PATENT OFFICE
CERTIFICATE OF CORRECTION

Patent No. 4,031,997      Dated June 28, 1977

Inventor(s)    Robert C. Nelson      Page 1 of 2

It is certified that error appears in the above-identified patent and that said Letters Patent are hereby corrected as shown below:

Col. 2; line 4 - "that" should be -- than --

Col. 2; line 42 - insert --end-- betweeen "outbye" and "rests"

Col. 3; line 1 - "26 to 48'" should be --26" to 48" --

Col. 3; line 24 - "hAS" should be --has--

Col. 3: line 49 - "convers" should be --covers--

Col. 5; line 67 - "side" should be --sides--

Col. 8; line 9 - delete "of" (second occurrence)

Col. 8; line 49 - "to" should be --the--

Col. 8; line 57 - delete "shaft 136" (second occurrence)

Col. 10; line 2 - "kydraulic" should be --hydraulic--

Col. 10; line 18 - "pump" should be --pumps--

Col. 10; line 38 - insert --end-- between "bye" and "of"

Col. 11; line 21 - insert --the-- between "when" and "series"

Col. 11: line 28 - "effect" should be --effort--

Col. 12; line 51 - "and" should be --or--

Col. 14; line 48 - "end" should be --ends--

UNITED STATES PATENT OFFICE
CERTIFICATE OF CORRECTION

Patent No. 4,031,997    Dated   June 28, 1977

Inventor(s)   Robert C. Nelson          Page 2 of 2

It is certified that error appears in the above-identified patent and that said Letters Patent are hereby corrected as shown below:

Col. 15; line 16 - insert --being-- between "unit" and

"wheel-mounted"

Col. 15; line 44 - "interconnected" should be --interconnection--

Col. 16; line 52 - insert --pair-- between "said" and "of"

Signed and Sealed this

Eleventh Day of October 1977

[SEAL]

Attest:

RUTH C. MASON  
Attesting Officer

LUTRELLE F. PARKER  
Acting Commissioner of Patents and Trademarks